United States Patent
Swann et al.

(10) Patent No.: US 7,967,905 B2
(45) Date of Patent: Jun. 28, 2011

(54) PROCESS FOR MIXING MODIFIED BITUMEN BY EXTRUSION

(75) Inventors: Raymond C. Swann, Kansas City, MO (US); Klaus Friedrich Gleich, Highlands Ranch, CO (US); Walter Alexander Johnson, Centennial, CO (US); Michael John Block, Centennial, CO (US); John VanNice, Lenexa, KS (US)

(73) Assignee: Johns Manville, Denver, CO (US)

( * ) Notice: Subject to any disclaimer, the term of this patent is extended or adjusted under 35 U.S.C. 154(b) by 440 days.

(21) Appl. No.: 11/999,454

(22) Filed: Dec. 5, 2007

(65) Prior Publication Data

US 2009/0145331 A1    Jun. 11, 2009

(51) Int. Cl.
*C08L 95/00* (2006.01)
*C08L 31/02* (2006.01)

(52) U.S. Cl. ........... 106/281.1; 366/89; 524/69; 524/59; 524/70

(58) Field of Classification Search ............... 106/281.1; 366/89; 524/59, 69, 70
See application file for complete search history.

(56) References Cited

U.S. PATENT DOCUMENTS

| 3,484,507 | A | * | 12/1969 | Smith | 524/69 |
| 4,610,902 | A | | 9/1986 | Eastman et al. | |
| 4,873,303 | A | | 10/1989 | Blackwood et al. | |
| 5,393,819 | A | * | 2/1995 | Peters | 524/406 |
| 2007/0092708 | A1 | | 4/2007 | Gleich et al. | |
| 2009/0213681 | A1 | * | 8/2009 | Ek et al. | 366/76.1 |

* cited by examiner

*Primary Examiner* — Robert D. Harlan
(74) *Attorney, Agent, or Firm* — Robert D. Touslee

(57) ABSTRACT

Provided is a method of mixing a modified bitumen composition and feeding one or more polymeric materials to an extruder, together with asphalt fed at more than one location along a length of the extruder. Improved mixing and elimination of asphalt melting in the production of rolled goods and other products is improved.

16 Claims, No Drawings

PROCESS FOR MIXING MODIFIED BITUMEN BY EXTRUSION

BACKGROUND

The use of roofing membranes as a waterproofing material on buildings is well known. The typical type of roofing membrane consists of a base sheet of a sheet-like material such as, for example, paper, felt, fabric, synthetic polymer film, woven or non-woven fabric, glass fibers, or metal foil with a bitumen (or asphalt) layer coated on both faces of the base sheet. Mineral granules or powder such as fine gravel, sand, or talcum are embedded in the surface of the bitumen layer in order to suppress the stickiness of the bitumen and also to protect the exposed bitumen layer from ultraviolet light after the bituminous roofing membrane is applied on site. The bottom of the membrane is covered with a layer of asphalt which is embedded with a back surfacing material such as sand to prevent the membrane from sticking to another membrane material during shipping and handling.

The above-described roofing membrane is not without problems, however. For example, the asphalt impregnated product has limited elongation properties which make it tend to buckle or crack upon thermal expansion and contraction. In contrast, modified bitumen roofing membrane has the advantages of having greater elongation and flexibility properties compared to unmodified bitumen roofing membrane materials. Modified bitumen has a much greater elasticity than unmodified bitumen and hence is less susceptible to buckling or cracking when exposed to temperature fluctuations.

Due to the nature of asphalt as a lubricant, however, mixing of polymer and asphalt, especially high concentrations of asphalt, to form modified bitumen is not easy to accomplish. Specifically, the viscosity of a blend of asphalt and polymer, which is dependent on the asphalt to polymer ratio, may not allow for good mixing.

Current production of modified asphaltic systems for use such as, for example, roofing membranes is based on a batch mixing process. Different raw materials such as, for example, asphalt, polymers, fillers, and flame retardants are mixed in separate mixing tanks at elevated temperatures. The mixing of raw materials, for example, polymer with asphalt, may require a high sheer device for blending. As such mixing is time consuming, the mixing can be a bottleneck in the production of membranes. Additionally, quality risks can be associated with the mixing, and the amount of modification is limited by the mixing that can be achieved in a batch mixing process.

SUMMARY

Provided is a method of mixing a modified bitumen composition, the method comprising feeding one or more polymeric materials to an extruder; feeding asphalt to the extruder at more than one location along a length of the extruder; and extruding a mixture comprising the one or more polymeric materials and asphalt from the extruder.

Also provided is a method of forming a reinforced modified bitumen composition, the method comprising feeding one or more polymeric materials to an extruder; feeding asphalt to the extruder at more than one location along a length of the extruder; feeding fibers to the extruder; extruding a mixture comprising the one or more polymeric materials, asphalt, and fiber from the extruder.

The presently claimed extrusion techniques provide mixed modified bitumen and reinforced modified bitumen compositions with improved quality and uniformity, while also realizing ease of production as compared to conventional batch mixing techniques. It has been surprisingly found that an important aspect in achieving the beneficial results of the presently claimed extrusion techniques is the addition of asphalt to the extruder at more than one location, for example, at least two locations or at least three locations, along a length of the extruder. In particular, while the first addition of asphalt preferably takes place in the extruder flow simultaneously or immediately after addition of polymeric material to the extruder, the presently claimed method includes additional downstream asphalt addition(s).

Further, the presently claimed extrusion techniques allow for a greater range of modification in modified bitumen compositions as compared to conventional batch mixing techniques. In particular, the presently claimed extrusion techniques allow for a wide range of polymer content in modified bitumen compositions, previously unachievable with batch mixing techniques due to the viscosity of the modified bitumen compositions, which is dependent on the asphalt to polymer ratio. Accordingly, additionally provided is an extruded modified bitumen composition comprising 1 to 99 weight % of one or more polymeric materials and 1 to 99 weight % asphalt.

DETAILED DESCRIPTION

Modified bitumen can contain asphalt and at least one polymer for imparting desirable characteristics to the modified bitumen. For example, a polymer additive can be used to improve various characteristics such as, for example, the thermal response, structural flexibility, aging characteristics, and/or adhesion characteristics. The polymer used to modify the bitumen can include, for example, styrene-butadiene-styrene (SBS) rubber, amorphous-poly-alpha olefins (APAOs), isotactic polypropylene, atactic polypropylene (APP) or a mixture thereof. The polymer additive used to modify the bitumen can be present in any effective amount.

Provided is a method of mixing modified bitumen wherein one or more polymeric materials is fed to an extruder, asphalt is fed to the extruder at more than one location along a length of the extruder, and a mixture comprising the one or more polymeric materials and asphalt is extruded from the extruder.

In an embodiment, the extrusion apparatus can be a twin-screw apparatus, for example a co-rotating twin-screw apparatus. In an exemplary embodiment, the extrusion apparatus has a length-to-diameter ratio (L/D) of at least about 60. An L/D of at least about 60 provides more effective scattering of feeds and resulting mixing capacity as compared to an L/D of less than 60. As increased L/D provides further improvements in mixing capacity, having unexploited mixing capacity in the extrusion apparatus is preferable to having insufficient mixing capacity provided by a smaller L/D.

Additional materials, such as, for example, fillers and/or flame retardant materials can additionally be added to the extruder for inclusion in the extruded modified bitumen composition. The polymeric materials can comprise about 3-80% of the extruded modified bitumen composition.

As noted above, the presently claimed extrusion techniques allow for a wide range of polymer content in modified bitumen compositions, previously unachievable with batch mixing techniques. Due to the nature of asphalt as a lubricant, mixing of polymer and asphalt to form modified bitumen can be difficult to accomplish. In particular, the viscosity of modified bitumen compositions is dependent on the asphalt to polymer ratio.

Regarding the location of feeds to the extrusion apparatus, the feed location for polymeric material is typically set at the feed throat at the upstream end of the extruder. The location and quantity of the asphalt injection points may be adjusted, especially the downstream injection points. As noted above, a key feature of the presently claimed methods is the addition of asphalt to the extruder at more than one location along a length of the extruder. Asphalt is preferably simultaneously fed into the feed throat at the upstream end of the extruder as mixing polymeric material without asphalt could pose a risk of overheating which could cause degradation in the polymer and/or a fire hazard. While polymeric material is fed into the extruder first, asphalt is preferably fed into the extruder almost immediately thereafter. The additional injections of asphalt allow for adjustment of the mixture to obtain a desired formulation. In an embodiment, asphalt is added in a ratio to polymeric material that maintains the modified bitumen composition just below total lubrication.

Similarly, the location and quantity of injection points of additional materials, such as, for example, filler (e.g., $CaCO_3$), could be adjusted, especially downstream addition point(s). The addition of filler can have an effect on viscosity of extruded modified bitumen composition. In particular, injection of filler into the first injection port at the upstream end of the extruder can aid in mixing, but filler can be added at one or more additional downstream injection points. Filler may also or alternatively be introduced into the feed throat.

In an embodiment, at least two extruders are used. Preferably, one extruder feed a second extruder. The extruders can have different diameters and/or length to diameter ratios. The extruders can be run at different screw speeds.

The dimensions and physical characteristics of the extruded modified bitumen can depend on the specific intended application of the product. For example, the extruded modified bitumen can be provided in the form of an elongated sheet. Preferably, the elongated sheet can be rolled to facilitate storage and transport of the material. The dimensions of the elongated sheet are not particularly limited and can depend on the specific application of the sheet.

The extruded modified bitumen can be used in various applications such as, for example, roofing applications for residential and/or commercial buildings (i.e., roofing membranes), paving or other infrastructure applications. In an exemplary embodiment, the extruded modified bitumen can be used in combination with reinforcement materials.

Reinforcement materials can include a plurality of fibers for providing structural reinforcement. While not wishing to be bound by any particular theory, it is believed that fibers which are excessively short do not adequately contribute to the structural reinforcement. Accordingly, the fibers preferably have dimensions which enable them to provide structural reinforcement to the modified bitumen. For example, the fibers can have an average length of about 250 mm or less, more preferably about 50 mm or less, and most preferably from about 15 mm to about 38 mm. The fibers may be any type, but are preferably discontinuous fibers.

The fibers can be of a material that is effective to provide structural reinforcement, and the specific material used can depend on the fabrication method employed, the specific application of the product, and/or the desired characteristics and properties of the product. For example, the plurality of fibers can comprise glass fibers, natural fibers, basalt fibers, polymer fibers such as polyester fibers, or a mixture thereof. In an embodiment, provided is a reinforced extruded modified bitumen composition including glass fibers.

The fibers are present in an amount that is effective to provide structural reinforcement. For example, the fibers can be present in an amount of from about 1% to about 49%, preferably from about 1% to about 15%, based on the weight of the extruded modified bitumen composition.

The shape of the fibers is not particularly limited, and the fibers can be substantially regularly or irregularly shaped. In an exemplary embodiment, fiber waste material can be used such as, for example, "basement fibers" which can be collected from below the floor level of a forming room in a fiber production facility. In embodiments where discontinuous fibers are initially used as the starting material, the average length of the discontinuous fibers in the resulting extruded modified bitumen composition is preferably at least about 70% to about 80% of the average initial length of such fibers.

The discontinuous fibers can be fed to the extruder to provide a reinforced extruded modified bitumen composition. The portion of the extrusion process in which the fibers are introduced and/or are present is preferably conducted under relatively low-shear conditions, for example, so as to reduce or avoid breakage of the fibers. The extrusion step is preferably conducted under conditions which enable "wet out" of the extruded material, i.e., the fibers and any other solid materials present in extrusion composition are sufficiently coated and dispersed in the extruded material.

Any extrusion apparatus capable of extruding the extrusion composition can be used. While not wishing to be bound to any particular theory, it is believed that maintaining a relatively long fiber length in the extruded material can increase the structural reinforcing effect of such fibers. The dimensions of the extrusion apparatus preferably enable the extrusion composition to be extruded under low-shear conditions, so as to reduce the degree of breakage of the fibers as described above.

Accordingly, use of an extrusion apparatus to mix modified bitumen compositions—in particular, by feeding polymeric material to the extrusion apparatus, adding asphalt to the extrusion apparatus at more than one location along a length of the extruder (for example, at the same location as the addition of the polymeric material and at least one additional downstream location), and extruding a modified bitumen composition from the extruder—provides numerous advantages over conventional batch mixing of modified bitumen compositions. Such advantages include, for example, improved quality of mixing with resultant improvements in uniformity of extruded modified bitumen compositions, speed of mixing, increased mixing capacity, and broader possible range of modified bitumen compositions.

The following illustrative example is intended to be non-limiting.

Example

A 60 L/D, 50 mm diameter Leistritz extruder was used to mix a modified bitumen composition comprising SBS. The extruder comprised 15 "barrels", each 4 L/D, with SBS pellets fed into barrel 1 (upstream end of the extruder), molten asphalt fed into barrels 1, 8, and 11, and $CaCO_3$ powder fed into barrels 1 and 8.

For an extruder output of 1000 pounds/hour (pph), the asphalt split between barrels 1:8:11 was 14%:28%:58% and the $CaCO_3$ split between barrels 1:8 was 31%:69%. The extruded modified bitumen composition comprised 8.75% SBS, 28.75% $CaCO_3$, and 62.50% asphalt. Other exemplary extruded modified bitumen compositions include: (1) 8.75% SBS, 43.75% $CaCO_3$, and 47.50% asphalt; (2) 5.00% SBS, 25.00% $CaCO_3$, and 70.00% asphalt; (3) 5.00% SBS, 55.00% $CaCO_3$, and 40.00% asphalt; (4) 12.50% SBS, 23.50% $CaCO_3$, and 55.00% asphalt; (5) 16.25% SBS, 21.25%

CaCO$_3$, and 62.50% asphalt; (6) 16.25% SBS, 36.25% CaCO$_3$, and 47.50% asphalt; (7) 02.00% SBS, 40.00% CaCO$_3$, and 60.00% asphalt; (8) 19.04% SBS, 14.29% CaCO$_3$, and 66.67% asphalt; and (9) 8% SBS, 30% CaCO$_3$, and 62% asphalt.

As noted above, while the SBS feed location is set (at the first injection port at the upstream end of the extruder), the location and quantity of the asphalt injection points could be adjusted, especially the downstream injection points. Asphalt is fed into the first injection port at the upstream end of the extruder as mixing SBS without asphalt could pose a risk of overheating which could cause degradation in the polymer and/or a fire hazard. While SBS is fed into the extruder first, asphalt is fed into the extruder almost immediately thereafter. Similarly, the location and quantity of the CaCO$_3$ injection points could be adjusted, especially the downstream injection point(s). In particular, injection of CaCO$_3$ into the first injection port at the upstream end of the extruder can aid in mixing, but the number of injection points of CaCO$_3$ could be increased.

In an embodiment, the screw speed of the extruder had a direct correlation with the extruder output at a ratio of approximately 1:1. Accordingly, for an extruder output of 1000 pph, the screw speed was set at 1000 rotations/minute (RPM) with a torque of 23%. The operating parameters were flexible, evidenced by the torque only increasing to 26% when the screw speed was lowered to 850 RPM. The temperature profile of the extruder is another operating parameter. In an embodiment, barrel 1 was not heated, barrels 2-3 were heated to 155° C. and barrels 4-15 were heated to 177° C. An additional operating parameter is selection of screw design/geometry for each of the barrels.

While a detailed description of specific exemplary embodiments has been provided, it will be apparent to one of ordinary skill in the art that various changes and modification can be made, and equivalents employed without departing from the scope of the claims.

The invention claimed is:

1. A method of mixing a modified bitumen composition, the method comprising:
   feeding one or more polymeric materials to an extruder;
   feeding asphalt to the extruder at more than one location along a length of the extruder; and
   extruding a mixture comprising the one or more polymeric materials and asphalt from the extruder.

2. The method of claim 1, wherein the extruder is a twin screw extruder.

3. The method of claim 2, comprising co-rotating the twin screws.

4. The method of claim 1, wherein the extruder has a length to diameter ratio of at least 60.

5. The method of claim 1, wherein the one or more polymeric materials comprise styrene-butadiene-styrene.

6. The method of claim 1, wherein the one or more polymeric materials comprise atactic polypropylene.

7. The method of claim 1, further comprising feeding one or more additional materials selected from the group consisting of fillers, flame retardant materials, and mixtures thereof, to the extruder.

8. The method of claim 1, wherein the one or more polymeric materials comprise about 3-80% of the mixture extruded from the extruder.

9. The method of claim 1, further comprising using at least two extruders.

10. The method of claim 9, wherein the at least two extruders have different diameters.

11. The method of claim 9, wherein the at least two extruders have different length to diameter ratios.

12. The method of claim 9, comprising running different screw speeds in the at least two extruders.

13. A method of forming a reinforced modified bitumen composition, the method comprising:
   feeding one or more polymeric materials to an extruder;
   feeding asphalt to the extruder at more than one location along a length of the extruder;
   feeding fiber to the extruder; and
   extruding a mixture comprising the one or more polymeric materials, asphalt, and discontinuous glass fiber from the extruder.

14. The method of claim 13 wherein the fibers are discontinuous fibers.

15. The method of claim 14 wherein the discontinuous fibers are glass.

16. The method of claim 13 wherein the fibers are synthetic polymer fibers.

* * * * *